United States Patent
Kunimoto et al.

[11] 3,732,421
[45] May 8, 1973

[54] COOLING APPARATUS

[75] Inventors: Wallace Y. Kunimoto, Goleta; Joseph S. Buller, Santa Barbara, both of Calif.

[73] Assignee: Santa Barbara Research Center, Goleta, Calif.

[22] Filed: May 20, 1971

[21] Appl. No.: 145,363

[52] U.S. Cl..............250/83 R, 250/83.3 H, 165/185
[51] Int. Cl.................................................G01t 1/24
[58] Field of Search..................250/83.3 H; 165/185, 165/133

[56] References Cited

UNITED STATES PATENTS

| | | | |
|---|---|---|---|
| 3,422,886 | 1/1969 | Buller | 165/133 |
| 3,620,186 | 11/1971 | King | 250/83.3 H |
| 3,529,164 | 9/1970 | Komatsubara et al. | 250/83.3 H |
| 3,602,714 | 8/1971 | Farmer | 250/83.3 H |

*Primary Examiner*—Archie R. Borchelt
*Assistant Examiner*—Davis L. Willis
*Attorney*—W. H. MacAllister, Jr. and Ernest L. Brown

[57] ABSTRACT

A dewar surrounding a cold region and attached to a radiating surface adapted to be directed toward dark space, whereby the dewar insulates the cold region from surrounding heat sources in an atmospheric environment, and it conducts heat away from the cold region to the radiating surface in a space environment.

10 Claims, 1 Drawing Figure

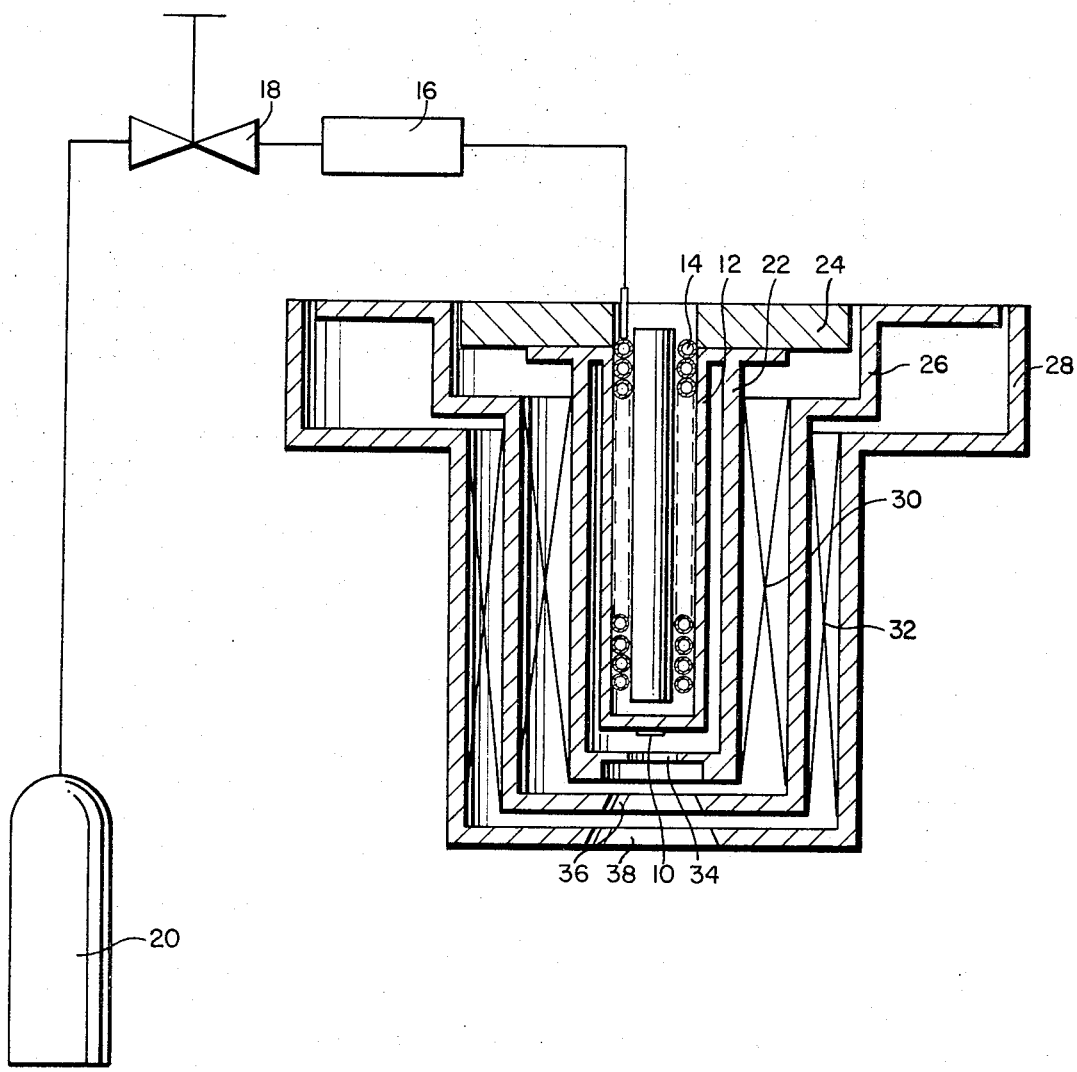
PATENTED MAY 8 1973
3,732,421
Wallace Y. Kunimoto,
Joseph S. Buller,
INVENTORS.
BY.
Ernest L Brown
ATTORNEY.

COOLING APPARATUS

BACKGROUND OF THE INVENTION

The invention is directed to apparatus adapted to maintain a radiation detector in a cold region at its optimum cryogenic operating temperature.

It is well known that radiation detectors have great utility in scanning the earth from an orbit position.

Most of the detectors now being used require, for efficient operation, that they be maintained at an ambient temperature in the cryogenic range, for example, below 77° K. Characteristically, prior art detector coolers use stored cryogens such as that shown and described in U.S. Pat. No. 3,457,730 which issued July 29, 1969 to R. L. Berry, et. al., for a "Throttling Valve Employing the Joule-Thomson Effect" which is assigned to Hughes Aircraft Company, the Assignee of the present application.

The use of a stored cryogen for cooling a radiation detector in space environment has the disadvantages of relatively short service life. Therefore, apparatus, such as the "Radiation Cooler for use in Space" of U.S. Pat. No. 3,422,886 which issued Jan. 21, 1969 to J. S. Buller and which is assigned to Hughes Aircraft Company, is typically used.

Unfortunately, testing of the apparatus using a radiation cooler requires that the equipment be placed in a vacuum and cooled by radiation while it is on the ground.

To avoid the necessity of using a vacuum during testing of the apparatus and prior to launch of the apparatus, the structure of this invention was conceived.

In the device contemplated by this invention, the radiation detector is cooled, while on the ground, by a cryostat surrounded by a dewar. The dewar insulates the detector from the surrounding heat of the atmosphere.

In a space environment, after the apparatus is launched, the cryostat is no longer connected and apparatus such as that shown and described in the above-mentioned U.S. Pat. No. 3,422,886 is used to cool the detector. The dewar, however, in the embodiment of this invention is not removed, but rather is attached to a radiating surface, whereby, in space, the wall of the dewar conducts heat from the radiation sensing device to the radiating surface.

SUMMARY

In order to aid in the understanding of this invention it can be stated that in essentially summary form that it is directed to a cooling apparatus which comprises a dewar having a wall for attachment of a device to be cooled on a cold region thereof, the cold region being coolable by heat transfer through the wall to a cooling means on the other side of the wall, or being coolable by heat transfer along the wall to a radiation surface attached to the wall.

It is therefore an object of this invention to use a dewar for insulating a cold region when the surrounding atmosphere is at a substantially higher temperature than the region to be cooled and to use the dewar as a conductor to a radiating surface, pointed toward the dark of space when the dark of space is cooler than the cold region.

It is another object of this invention to maintain a radiation sensor at cryogenic temperatures.

It is still another object of this invention to provide a method for cooling a cold region, and particularly when a radiation detector is in said cold region.

BRIEF DESCRIPTION OF THE DRAWINGS

Other objects will become apparent from the following description, taken in connection with the accompanying drawings, in which the only drawing is a view, partly in section, of the apparatus of this invention, schematically connected to a source of gas for the cryostat.

DETAILED DESCRIPTION OF THE INVENTION

A radiation sensor 10, such as a infrared sensor, is maintained at a cryogenic temperature by the apparatus of this invention.

In a preferred embodiment the sensor device 10 is positioned on a cold region on the end of a cold finger 12. Internal of the cold finger 12 is a plurality of coils such as the coil 14 attached, through a filter 16 and a control valve 18, to a source 20 of a gas such as nitrogen.

The cold finger 12 also forms the inner wall of a dewar. The outer wall of the dewar is shown at 22. Between the walls 12 and 22 a vacuum is maintained.

The inner and outer walls 12 and 22 of the dewar are conductively connected to a radiating member 24. The radiating member 24 preferably has a black outer surface, whereby heat is radiated into space when said surface is pointed at free space or a region colder than the radiator.

The remainder of the structure such as the member 26 and the member 28 may be supported, for example, by means, such as wires 30 and 32, in the fashion shown, described and claimed in the above-mentioned U.S. Pat. No. 3,422,886. Member 26 corresponds to the second radiation stage of that patent.

Windows 34, 36, and 38 allow the sensor 10 to receive radiation. To that end, the windows may be made of special material to allow infrared radiation to pass therethrough.

Prior to launch, or during tests of the apparatus, upon the ground or in an atmosphere, with sensor 10, for example, at 77° K and the outer atmosphere, for example, at 300° K the heat conduction from the outer atmosphere into the detector 10 is on the order of one and one-half watts. The one and one-half watts of power are removed by the gas in the cryostat coils 14.

During this pre-launch phase, the sensor 10 can be cooled by other means. For example, liquid nitrogen may be placed in contact with the sensor 10 or a heat engine may be used. Radiation, however, is usually insufficient because of the amount of heat which must be removed.

In a space environment, the wall 12 acts as a conductor of heat. With the surface of the radiator 24 pointed toward the darkness of space, the temperature difference between the detector 10 and free space is on the order of 0.25° K, and the heat conduction of the wall 12 is on the order of 0.001 watts. The surface of radiator 24 is preferably black to the long wave infrared associated with heat radiation although it may even be visibly white.

Typically, the wall 12 is made of copper and nickel alloy. A typical wall thickness of the wall 12 is 0.015 inches, a typical length of the wall 12 between the detector 10 and the radiator 24 is 1.75 inches, and a typical diameter of the wall 12 is 0.204 inches.

In addition to the functions just mentioned, the dewar prevents moisture from condensing in the region of the detector 10, whereby dust and other foreign particles are prevented from adhering to the detector 10 and thereby ruining the detector.

Thus, the combination of this invention is particularly designed for a multiple use. That is, the dewar acts as an insulator where the outside temperature is relatively high and as a conductor to a radiator when the radiator is looking toward a cold sport in space and the outside temperature is relatively low.

Although the invention has been described in detail above, it is not intended that the invention shall be limited by that description but only in accordance with that description taken in combination with the appended claims.

What is claimed is:

1. A cooling apparatus comprising:
   a dewar surrounding a cold region;
   a wall forming a portion of a cold finger and attached to said dewar;
   said cold region being on said wall and being for attachment thereto of a device to be cooled;
   means associated with said wall for cooling said wall for conductive cooling of the cold region by heat conduction through said wall; and
   radiating surfaces attached to said wall and conductively connected to said cold region for cooling the cold region by conduction along said wall.

2. Apparatus as recited in claim 1 in which said radiating surfaces are black to infrared radiation at long wavelengths.

3. Apparatus as recited in claim 1 in which said wall is a wall of said dewar.

4. Apparatus as recited in claim 3 wherein said means for cooling said wall is a cryostat, positioned within said dewar, for removing heat from said cold region.

5. Apparatus as recited in claim 4 and further comprising a source of gas attached to said cryostat and at least a valve between said source of gas and said cryostat.

6. Apparatus as recited in claim 5 in which said radiating surface is black to infrared radiation at long wavelengths.

7. Apparatus as recited in claim 6 and further comprising a radiation detector attached for thermal communication to said wall in said cold region.

8. Apparatus as recited in claim 7 wherein said wall is an inner wall of said dewar, said dewar having an outer wall which has a window therein in the region of said detector for transmitting radiation to be detected.

9. Apparatus as recited in claim 8 wherein a second stage radiation cooler extends partially around said dewar.

10. Apparatus as recited in claim 9 in which said second stage radiation cooler has a window therein, positioned to allow radiation to be received by said detector through said windows in said dewar and said radiation cooler.

* * * * *